US012563427B2

(12) United States Patent
Zhang et al.

(10) Patent No.: US 12,563,427 B2
(45) Date of Patent: Feb. 24, 2026

(54) METHOD AND APPARATUS FOR ENHANCED PHYSICAL DOWNLINK CONTROL CHANNEL (PDCCH) MONITORING ON OVERLAPPING PDCCH MONITORING OCCASIONS

(71) Applicant: LENOVO (BEIJING) LIMITED, Beijing (CN)

(72) Inventors: Yi Zhang, Beijing (CN); Chenxi Zhu, Fairfax, VA (US); Bingchao Liu, Beijing (CN); Wei Ling, Beijing (CN); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 380 days.

(21) Appl. No.: 18/248,600

(22) PCT Filed: Oct. 12, 2020

(86) PCT No.: PCT/CN2020/120309
§ 371 (c)(1),
(2) Date: Apr. 11, 2023

(87) PCT Pub. No.: WO2022/077145
PCT Pub. Date: Apr. 21, 2022

(65) Prior Publication Data
US 2023/0413081 A1      Dec. 21, 2023

(51) Int. Cl.
*H04W 72/23*        (2023.01)
*H04W 24/08*        (2009.01)
*H04W 72/232*       (2023.01)

(52) U.S. Cl.
CPC .......... *H04W 24/08* (2013.01); *H04W 72/232* (2023.01)

(58) Field of Classification Search
CPC ... H04W 24/08; H04W 72/232; H04W 72/02; H04W 72/0446; H04W 72/10;
(Continued)

(56) References Cited

U.S. PATENT DOCUMENTS

2019/0174466 A1*  6/2019  Zhang ................... H04L 5/0057
2020/0045569 A1   2/2020  Inkwon et al.
(Continued)

OTHER PUBLICATIONS

ASUSTek "Enhancements on multiple TRP or panel transmission", 3GPP TSG RAN WG1 #96, R1-1903046; Mar. 1, 2019; pp. 1-5.
(Continued)

*Primary Examiner* — Wei Zhao
(74) *Attorney, Agent, or Firm* — AMPACC Law Group, PLLC

(57) ABSTRACT

Embodiments of the present application are directed to a method and apparatus for enhanced PDCCH monitoring on overlapping PDCCH monitoring occasions. A method according to an embodiment of the present application may include: receiving configuration information for monitoring a plurality of physical downlink control channel (PDCCH) transmissions, wherein the configuration information includes a plurality of search space sets; selecting at least one search space set with different quasi co-location (QCL)-Type D information from each other for monitoring from the plurality of search space sets based on a rule; and monitoring at least one search space set including the selected at least one search space set on monitoring occasions.

20 Claims, 8 Drawing Sheets

100

(58) Field of Classification Search
CPC .. H04W 72/23; H04W 72/044; H04B 7/0617;
H04B 7/061
See application file for complete search history.

(56) References Cited

U.S. PATENT DOCUMENTS

| | | | | |
|---|---|---|---|---|
| 2020/0100248 | A1 | 3/2020 | Taehyoung et al. | |
| 2020/0322929 | A1 | 10/2020 | Hossein et al. | |
| 2021/0195559 | A1* | 6/2021 | Khoshnevisan | H04W 72/23 |
| 2021/0314927 | A1* | 10/2021 | Noh | H04L 5/0023 |

OTHER PUBLICATIONS

International Search Report and Written Opinion dated Jul. 8, 2021
for International Application No. PCT/CN2020/120309.
Spreadtrum Communications, "Discussion on enhancements on
beam management for multi-TRP" 3GPP TSG RAN WG1#102-e;
R1-2006260; Aug. 28, 2020; 4 pages.
European Search Report and Written Opinion dated Jun. 14, 2024
for European Patent Application No. 20956927.6.

* cited by examiner

100

CORESET 1     301     USS1; TRP1
TCI state 1/QCL-type D1

CORESET 2     302     USS2; TRP1
TCI state 2/QCL-type D2

CORESET 3     303     USS3; TRP2
TCI state 3/QCL-type D3

CORESET 0

401

USS0
QCL-type D0

CORESET 1

402

USS1
QCL-type D1

CORESET 2

403

USS2
QCL-type D2

METHOD AND APPARATUS FOR ENHANCED PHYSICAL DOWNLINK CONTROL CHANNEL (PDCCH) MONITORING ON OVERLAPPING PDCCH MONITORING OCCASIONS

CROSS REFERENCE TO RELATED APPLICATIONS

This application is a national phase entry of International Application No. PCT/CN2020/120309 filed Oct. 12, 2020, which is incorporated by reference in its entirety.

TECHNICAL FIELD

Embodiments of the present application generally relate to wireless communication technology, especially to a method and apparatus for enhanced physical downlink control channel (PDCCH) monitoring on overlapping PDCCH monitoring occasions.

BACKGROUND

As the demand on mobile broadband increases, cellular networks are deployed more densely and heterogeneously with a greater number of transmit-receive points (TRPs). Each TRP may transmit assignment of resources to be used by a user equipment (UE). For example, a TRP can transmit control information on PDCCH. In some implementations, multiple TRPs (mTRP) may be serving a same UE. In NR Release 16 (R16) MIMO, multi-downlink control information (DCI) based multiple TRPs is supported for scheduling multiple physical downlink shared channel (PDSCH). In Release 17 (R17), PDCCH is being enhanced for improving reliability with multiple TRP transmission. Furthermore, in R17, simultaneous reception of PDCCH with different transmission configuration indicator (TCI) state including different co-location (QCL)-Type D is one kind of enhancement for beam management enhancement.

Now, some UEs have multiple panels. Thus, on account of enhanced UE capability (for example, having multiple panels) and enhanced PDCCH (ePDCCH) transmission with multiple TCI states, how to monitor multiple PDCCH transmissions with different QCL-Type D on overlapping PDCCH monitoring occasions needs to be considered.

SUMMARY OF THE APPLICATION

Some embodiments of the present application provide a method, performed by a user equipment (UE). The method may include receiving configuration information for monitoring a plurality of physical downlink control channel (PDCCH) transmissions, wherein the configuration information includes a plurality of search space sets; selecting at least one search space set with different quasi co-location (QCL)-Type D information from each other for monitoring from the plurality of search space sets based on a rule; and monitoring at least one search space set including the selected at least one search space set on monitoring occasions.

In an embodiment of the present application, monitoring the at least one search space set may further include: further monitoring at least one search space set with a same QCL-Type D information as the selected at least one search space set on monitoring occasions.

In an embodiment of the present application, selecting the at least one search space set for monitoring based on the rule may include: selecting a search space set with a first priority from each search space superset of a plurality of search space supersets, wherein the search space superset includes at least one search space set.

In an embodiment of the present application, the search space superset is associated with at least one of the following: a same UE panel; a same TCI information associated with a UE panel; a same transmit-receive point (TRP); or a same CORESET pool index.

In an embodiment of the present application, a number of the plurality of search space supersets is equal to at least one of the following: a number of UE panels; a number of TCI information associated with UE panels; a number of TRPs; or a number of CORESET pool indexes.

In an embodiment of the present application, selecting the search space set with the first priority from each search space superset comprises: selecting the search space set with the first priority based on at least one of the following: a type of search space; an index of search space; or an index of cell.

In an embodiment of the present application, selecting the search space set with the first priority from each search space superset may further include: selecting a common search space (CSS) set with a lowest index in a cell with a lowest index containing a CSS set; and selecting a UE specific search space (USS) set with a lowest index in the cell with the lowest index in the case that there is no CSS set in the search space superset.

In an embodiment of the present application, selecting the search space set with the first priority from each search space superset may further include: in the case that there is no allocated PDCCH candidates in the search space set with the first priority, selecting a USS set with a second priority from the search space superset.

In another embodiment of the present application, selecting the at least one search space set for monitoring based on the rule may include: selecting the at least one search space set associated with one full PDCCH transmission for monitoring on the monitoring occasions, wherein the full PDCCH transmission indicates a normal PDCCH transmission with one transmission of a downlink control information (DCI) or multiple transmissions of an ePDCCH transmission with multiple transmissions of a DCI.

In an embodiment of the present application, selecting the at least one search space set associated with one full PDCCH transmission for monitoring on the monitoring occasions may include: when a frequency division multiplexed based ePDCCH transmission scheme is used, selecting a plurality of search space sets for the multiple transmissions of the ePDCCH transmission by giving the plurality of search space sets for the multiple transmissions of the ePDCCH transmission a priority higher than that of a search space set for the normal PDCCH transmission.

In an embodiment of the present application, selecting the at least one search space set associated with one full PDCCH transmission for monitoring on the monitoring occasions may include: when a frequency division multiplexed based ePDCCH transmission scheme is used, selecting a search space set for the normal PDCCH transmission, wherein the normal PDCCH transmission has a lowest search space set index among search space sets for the multiple transmissions of the ePDCCH transmission and the normal PDCCH transmission.

In an embodiment of the present application, selecting the at least one search space set associated with one full PDCCH transmission for monitoring on the monitoring occasions may include: when a frequency division multiplexed based ePDCCH transmission scheme is used, selecting a plurality of search space sets for the multiple transmissions of the ePDCCH transmission, wherein one of the plurality of search space sets for the multiple transmissions of the ePDCCH transmission has a lowest search space set index among search space sets for the multiple transmissions of the ePDCCH transmission and the normal PDCCH transmission.

In an embodiment of the present application, selecting the at least one search space set associated with one full PDCCH transmission for monitoring on the monitoring occasions may include: when a time-division multiplexed based ePDCCH transmission scheme is used and a first search space set for a first transmission for the ePDCCH transmission is monitored on a previous monitoring occasion, selecting a second search space set for a second transmission for the ePDCCH transmission on a current monitoring occasion by giving the second search space set for the second transmission for the ePDCCH transmission a priority higher than that of a search space set for the normal PDCCH transmission.

In an embodiment of the present application, selecting the at least one search space set associated with one full PDCCH transmission for monitoring on the monitoring occasions may include: when a time-division multiplexed based ePDCCH transmission scheme is used and a first search space set for a first transmission for the ePDCCH transmission is not monitored on a previous monitoring occasion, selecting a search space set for a normal PDCCH transmission rather than a second search space set for a second transmission for the ePDCCH transmission on a current monitoring occasion by giving a search space set for the normal PDCCH transmission a priority higher than that of the second search space set for the second transmission for the ePDCCH transmission.

In an embodiment of the present application, a number of the selected at least one search space set depends on a capability of the UE.

In an embodiment of the present application, the rule is preconfigured, predetermined, or configured by a base station (BS).

Some other embodiments of the present application provide a method performed by a base station (BS). The method may include: transmitting configuration information for monitoring a plurality of physical downlink control channel (PDCCH) transmissions, wherein the configuration information includes a plurality of search space sets; selecting at least one search space set with different QCL-Type D information from each other to be monitored by a user equipment (UE) from the plurality of search space sets based on a rule; and transmitting at least one physical downlink control channel (PDCCH) transmission corresponding to at least one search space set including the selected at least one search space set.

In an embodiment of the present application, transmitting the at least one PDCCH transmission may further include: further transmitting at least one PDCCH transmission corresponding to at least one search space set with a same QCL-Type D information as the selected at least one search space set.

In an embodiment of the present application, selecting the at least one search space set for monitoring based on the rule may include: selecting a search space set with a first priority from each search space superset of a plurality of search space supersets, wherein the search space superset includes at least one search space set.

In an embodiment of the present application, the search space superset is associated with at least one of the following: a same UE panel; a same TCI information associated with a UE panel; a same transmit-receive point (TRP); or a same CORESET pool index.

In an embodiment of the present application, a number of the plurality of search space supersets is equal to at least one of the following: a number of UE panels; a number of TCI information associated with UE panels; a number of TRPs; or a number of CORESET pool indexes.

In an embodiment of the present application, selecting the search space set with the first priority from each search space superset comprises: selecting the search space set with the first priority based on at least one of the following: a type of search space; an index of search space; or an index of cell.

In an embodiment of the present application, selecting the search space set with the first priority from each search space superset may further include: selecting a common search space (CSS) set with a lowest index in a cell with a lowest index containing a CSS set; and selecting a UE specific search space (USS) set with a lowest index in the cell with the lowest index in the case that there is no CSS set in the search space superset.

In an embodiment of the present application, selecting the search space set with the first priority from each search space superset may further include: in the case that there is no allocated PDCCH candidates in the search space set with the first priority, selecting a USS set with a second priority from the search space superset.

In another embodiment of the present application, selecting the at least one search space set for monitoring based on the rule may include: selecting the at least one search space set associated with one full PDCCH transmission for monitoring on the monitoring occasions, wherein the full PDCCH transmission indicates a normal PDCCH transmission with one transmission of a downlink control information (DCI) or multiple transmissions of an ePDCCH transmission with multiple transmissions of a DCI.

In an embodiment of the present application, selecting the at least one search space set associated with one full PDCCH transmission for monitoring on the monitoring occasions may include: when a frequency division multiplexed based ePDCCH transmission scheme is used, selecting a plurality of search space sets for the multiple transmissions of the ePDCCH transmission by giving the plurality of search space sets for the multiple transmissions of the ePDCCH transmission a priority higher than that of a search space set for the normal PDCCH transmission.

In an embodiment of the present application, selecting the at least one search space set associated with one full PDCCH transmission for monitoring on the monitoring occasions may include: when a frequency division multiplexed based ePDCCH transmission scheme is used, selecting a search space set for the normal PDCCH transmission, wherein the normal PDCCH transmission has a lowest search space set index among search space sets for the multiple transmissions of the ePDCCH transmission and the normal PDCCH transmission.

In an embodiment of the present application, selecting the at least one search space set associated with one full PDCCH transmission for monitoring on the monitoring occasions may include: when a frequency division multiplexed based ePDCCH transmission scheme is used, selecting a plurality of search space sets for the multiple transmissions of the ePDCCH transmission, wherein one of the plurality of search space sets for the multiple transmissions of the ePDCCH transmission has a lowest search space set index among search space sets for the multiple transmissions of the ePDCCH transmission and the normal PDCCH transmission.

In an embodiment of the present application, selecting the at least one search space set associated with one full PDCCH transmission for monitoring on the monitoring occasions may include: when a time-division multiplexed based ePDCCH transmission scheme is used and a first search space set for a first transmission for the ePDCCH transmission is monitored on a previous monitoring occasion, selecting a second search space set for a second transmission for the ePDCCH transmission on a current monitoring occasion by giving the second search space set for the second transmission for the ePDCCH transmission a priority higher than that of a search space set for the normal PDCCH transmission.

In an embodiment of the present application, selecting the at least one search space set associated with one full PDCCH transmission for monitoring on the monitoring occasions may include: when a time-division multiplexed based ePDCCH transmission scheme is used and a first search space set for a first transmission for the ePDCCH transmission is not monitored on a previous monitoring occasion, selecting a search space set for a normal PDCCH transmission rather than a second search space set for a second transmission for the ePDCCH transmission on a current monitoring occasion by giving a search space set for the normal PDCCH transmission a priority higher than that of the second search space set for the second transmission for the ePDCCH transmission.

In an embodiment of the present application, a number of the selected at least one search space set depends on a capability of the UE.

In an embodiment of the present application, the rule is preconfigured or predetermined.

Some other embodiments of the present application provide an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above methods with the at least one receiver, the at least one transmitter and the at least one processor.

According to the embodiments of the present application, a priority rule is specified and used to select search space sets with multiple QCL-Type D for monitoring on a PDCCH monitoring occasion with respect to a normal PDCCH transmission and ePDCCH transmission on account of enhanced UE capability (for example, having multiple panels) and ePDCCH transmission with multiple TCI states, thus enhanced PDCCH monitoring for multiple PDCCH with different QCL-Type D on overlapped monitoring occasions can be realized.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

6

Figure 1:
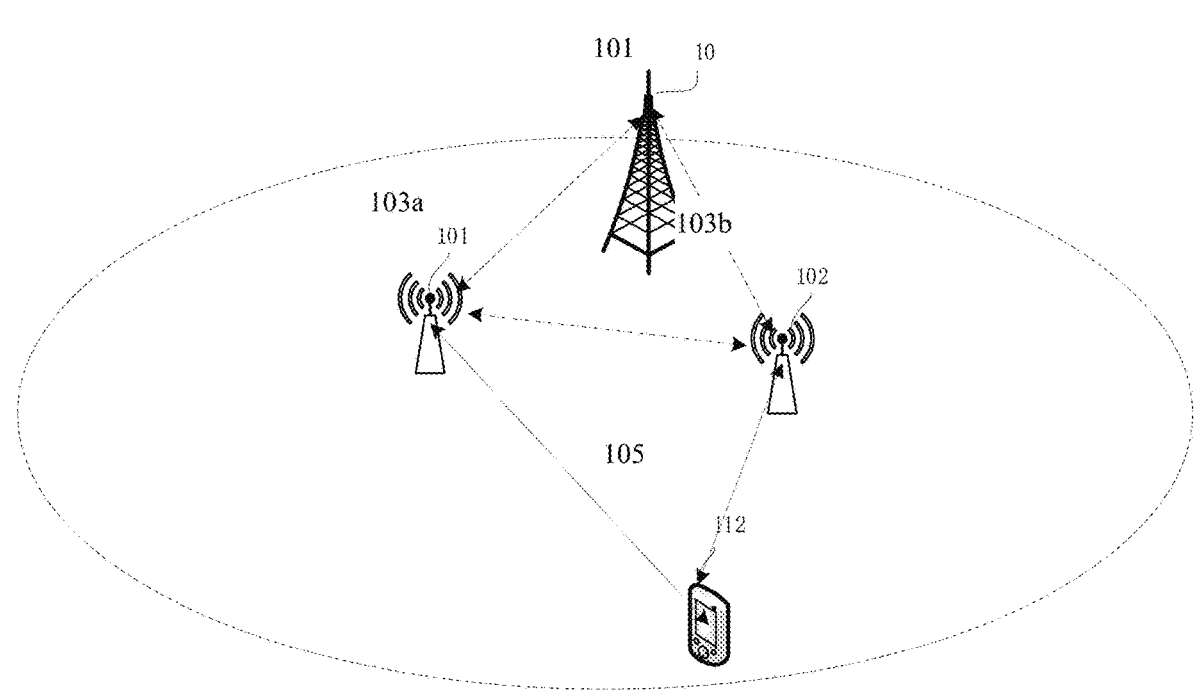
Figure 2:
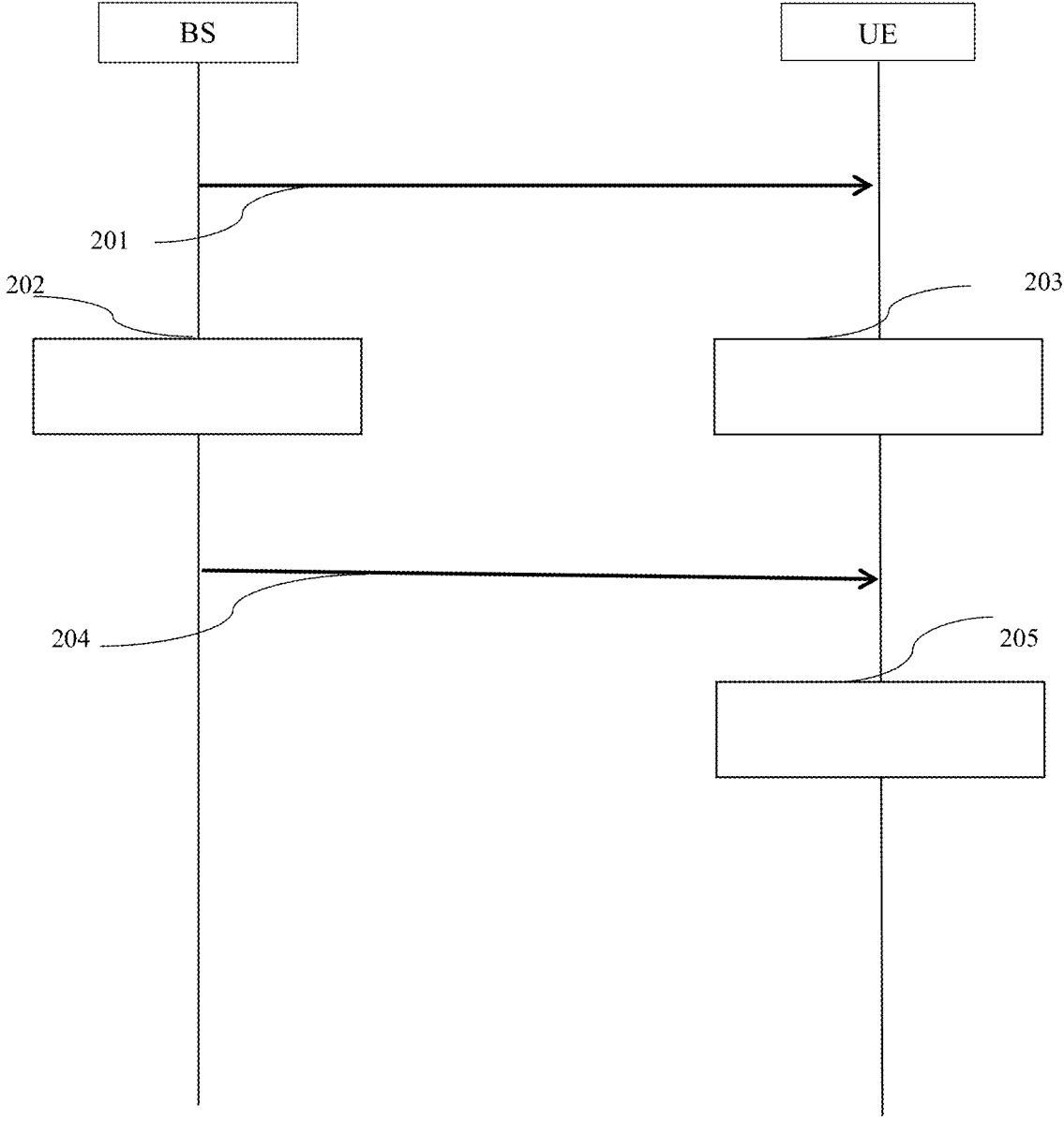
Figure 3:
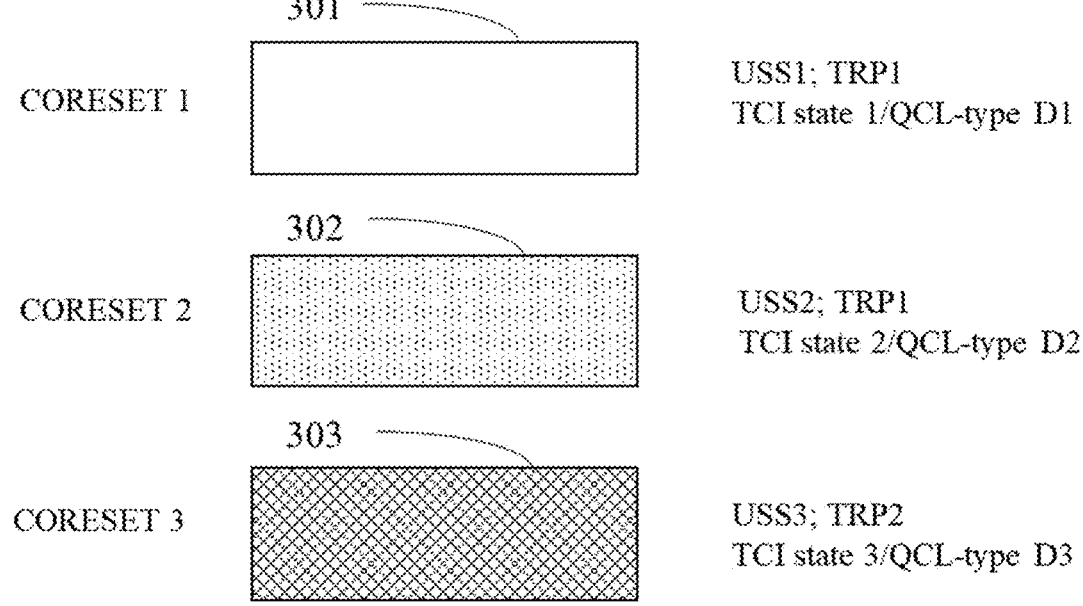
Figure 4:
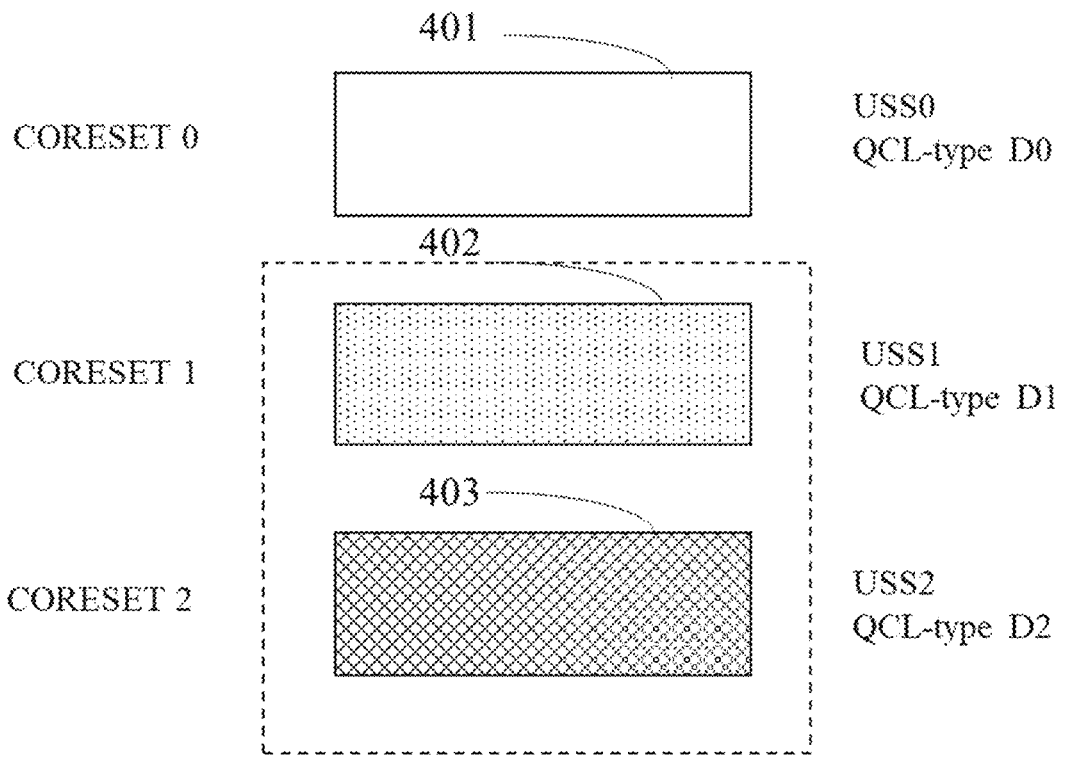
Figure 5:
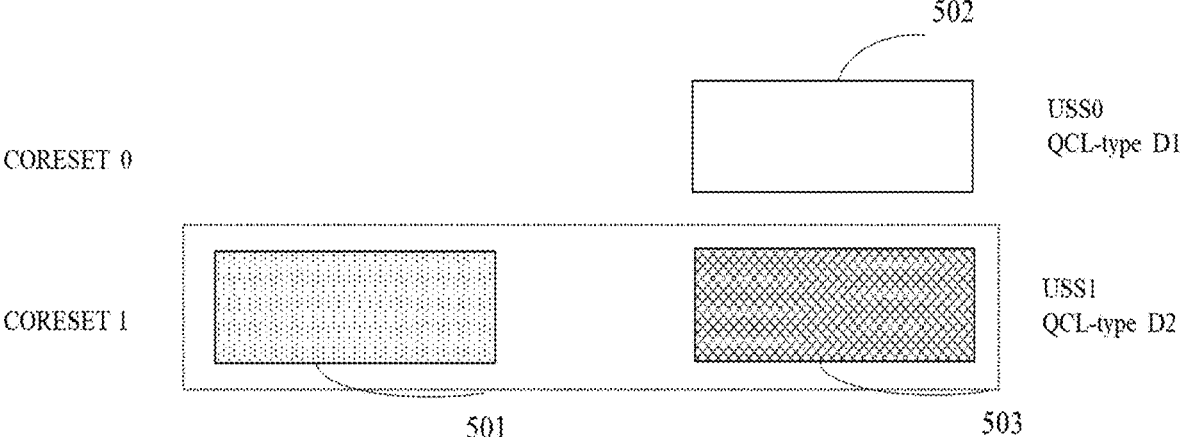
Figure 6:
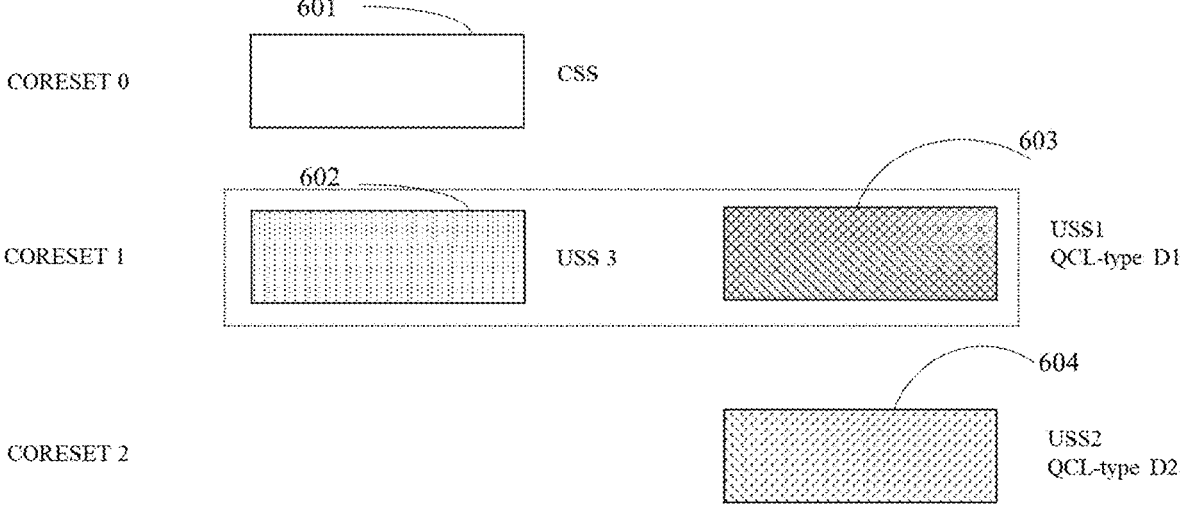
Figure 7:
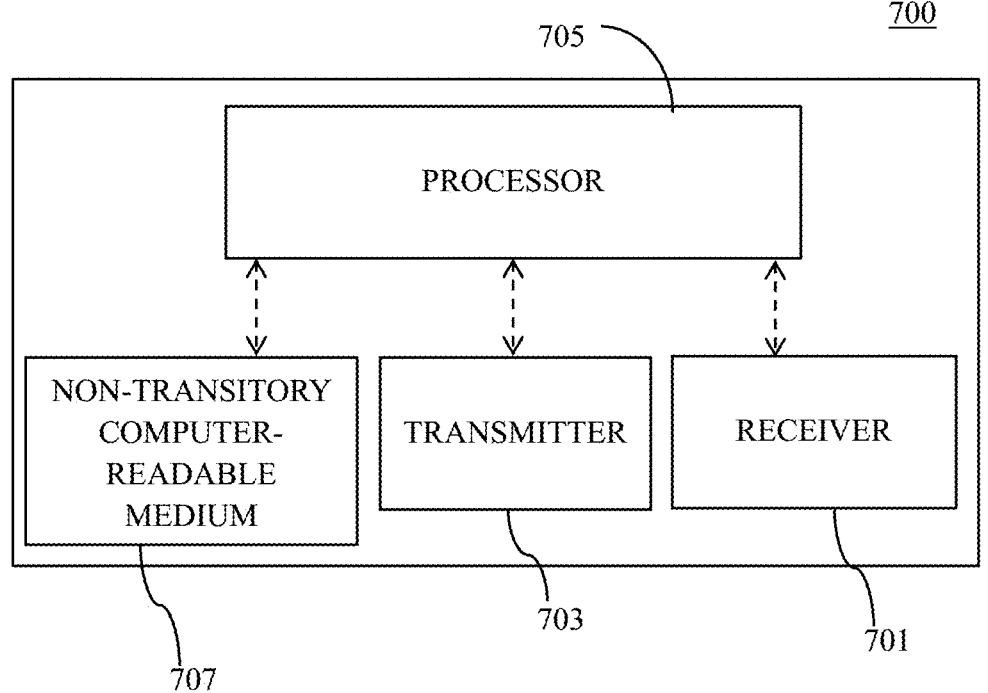
Figure 8:
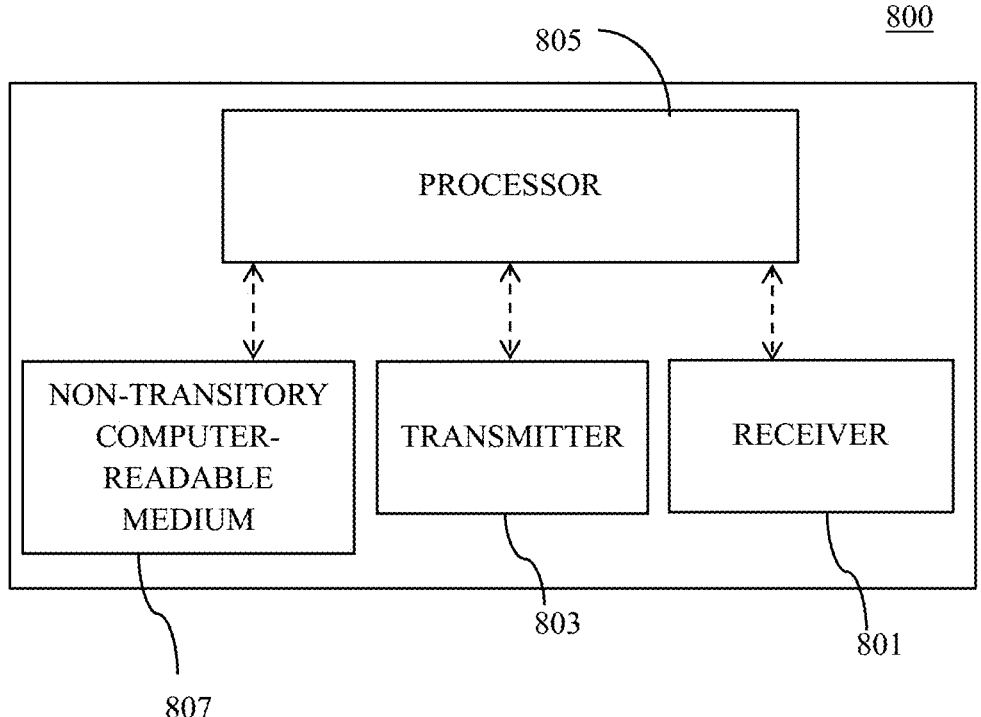

FIG. 1 is a schematic diagram illustrating an exemplary wireless communication system according to some embodiments of the present application;

FIG. 2 is a flow chart illustrating a method for enhanced PDCCH monitoring on overlapping PDCCH monitoring occasions according to some embodiments of the present application;

FIG. 3 is an exemplary scenario for enhanced PDCCH monitoring on overlapping PDCCH monitoring occasions according to an embodiment of the present application;

FIG. 4 is another exemplary scenario for enhanced PDCCH monitoring on overlapping PDCCH monitoring occasions according to another embodiment of the present application;

FIG. 5 is another exemplary scenario for enhanced PDCCH monitoring on overlapping PDCCH monitoring occasions according to another embodiment of the present application;

FIG. 6 is another exemplary scenario for enhanced PDCCH monitoring on overlapping PDCCH monitoring occasions according to another embodiment of the present application;

FIG. 7 is a schematic block diagram illustrating an exemplary apparatus according to an embodiment of the present application; and FIG. 8 is a schematic block diagram illustrating another exemplary apparatus according to an embodiment of the present application.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

A wireless communication system generally includes one or more base stations (BSs) and one or more UEs. Furthermore, a BS may be configured with one TRP (or panel) or more TRPs (or panels). A TRP can act like a small BS. The TRPs can communicate with each other by a backhaul link. In a wireless communication system, one single TRP can be used to serve one or more UEs under control of a BS. In different scenario, TRP may be called in different terms. Persons skilled in the art should understand that as the 3rd Generation Partnership Project (3GPP) and the communication technology develop, the terminologies recited in the specification may change, which should not affect the scope of the present application. It should be understood that the TRP(s) (or panel(s)) configured for the BS may be transparent to a UE.

FIG. 1 is a schematic diagram illustrating an exemplary wireless communication system according to some embodiments of the present application.

Referring to FIG. 1, a wireless communication system 100 may include a BS 101 and a UE 105. Furthermore, the BS 101 is further configured with two TRPs (e.g., TRP 103a and TRP 103b). Although only one BS, two TRPs, and one UE are shown for simplicity, it should be noted that the wireless communication system 100 may further include additional BSs, TRPs, and UEs.

The BS 101 may be a gNB in some scenarios (e.g. in 5G application scenario). The TRP 103*a* and TRP 103*b* may connect the BS 101, via, for example, a backhaul link. Each TRP can serve the UE 105. As shown in FIG. 1, TRP 103*a* and TRP 103*b* can serve the UE 105 within a serving area or region (e.g., a cell or a cell sector). The TRP 103*a* and TRP 103*b* can communicate with each other via, for example, a backhaul link. In some cases, the backhaul link is an ideal backhaul link; in some other cases, the backhaul link is a non-ideal backhaul link. It should be understood that the TRP 103*a* and TRP 103*b* configured for the BS 101 may be transparent to the UE 105.

In some embodiments of the present application, the BS 101 may be distributed over a geographic region. In certain embodiments, the BS 101 may also be referred to as an access point, an access terminal, a base, a macro cell, a Node-B, an enhanced Node B (eNB), a gNB, a Home Node-B, a relay node, or any device described using other terminology used in the art.

The UE 105 may include computing device, such as desktop computer, laptop computer, personal digital assistant (PDA), tablet computer, smart television (e.g., televisions connected to the Internet), set-top box, game console, security system (including security camera), vehicle onboard computer, network device (e.g., router, switch, and modem), or the like. According to an embodiment of the present application, the UE 105 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 105 may include wearable device, such as smart watch, fitness band, optical head-mounted display, or the like. Moreover, the UE 105 may be referred to as a subscriber unit, a mobile phone, a mobile station, a user, a terminal, a mobile terminal, a wireless terminal, a fixed terminal, a subscriber station, a user terminal, or any device described using other terminology used in the art. The UE 105 may communicate directly with the BS 101 via uplink communication signals.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In one embodiment, the wireless communication system 100 is compatible with the 5G NR of the 3GPP protocol, wherein the BS 101 transmit data using an orthogonal frequency division multiplexing (OFDM) modulation scheme on the downlink and the UE 105 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BS 101 may communicate using other communication protocols, such as the IEEE 802.11 family of wireless communication protocols. Further, in some embodiments of the present application, the BS 101 may communicate over licensed spectrums, whereas in other embodiments, the BS 101 may communicate over unlicensed spectrums. The present application is not intended to be limited to the implementation of any particular wireless communication system architecture or protocol. In yet some embodiments of present application, the BS 101 may communicate with the UE 105 using the 3GPP 5G protocols.

In radio access network (RAN) 1 #102 e-meeting, time division multiplexing (TDM), frequency division multiplexing (FDM), or single frequency network (SFN) multiplexing schemes are agreed to be studied for multiple TRPs (mTRP) PDCCH reliability enhancement. In particular, for TDM, two sets of symbols of the transmitted PDCCH, two non-overlapping (in time) transmitted PDCCH repetitions, or non-overlapping (in time) multi-chance transmitted PDCCH are associated with different TCI states. For FDM, two sets of resource element group (REG) bundles/control channel elements (CCEs) of the transmitted PDCCH, two non-overlapping (in frequency) transmitted PDCCH repetitions, or non-overlapping (in frequency) multi-chance transmitted PDCCH are associated with different TCI states. The PDCCH transmission or PDCCH repetition described here may be also called an ePDCCH transmission. Based on the agreement, simultaneous receiving multiple PDCCH with different TCI state including different QCL-Type D, is required to support TDM-based, FDM-based and SFN-based space division multiplexing (SDM) ePDCCH scheme. Furthermore, simultaneous reception of PDCCH transmissions with different QCL-Type D is one kind of enhancement in R17 for beam management enhancement.

According to current specification (for example, 3GPP TS 38.213, the content of which is herein incorporated by reference), a UE does not support simultaneous monitoring PDCCH with different QCL-Type D. In the case of multiple PDCCHs with different QCL-Type D, only PDCCH(s) with the highest monitoring priority are monitored on overlapping PDCCH monitoring occasions, where the priority rule for monitoring is specified according to search space set type, i.e. common search space (CSS) set or UE specific search space (USS) set, search space set index and cell index (for example, the UE monitors PDCCHs only in a CORE-SET, and in any other CORESET from the multiple CORE-SETs having same QCL-Type D properties as the CORE-SET, on the active DL BWP of a cell from the one or more cells, the CORESET corresponds to the CSS set with the lowest index in the cell with the lowest index containing CSS, if any; otherwise, to the USS set with the lowest index in the cell with lowest index, which is also called the priority rule in R15 in the following description).

However, if a UE has multiple panels, it may have the capability to monitor one or multiple PDCCHs with different QCL-Type D simultaneously. Also, multiple TCI states can be used for the ePDCCH transmission, it may have impact on ePDCCH monitoring priority on account of design goal for reliability. On account of enhanced UE capability and ePDCCH transmission with multiple TCI states, how to support the monitoring of multiple PDCCHs with different QCL-Type D on overlapping PDCCH monitoring occasions is discussed in the following description of the present application.

In the embodiments of the present application, the enhanced monitoring behavior on overlapping PDCCH monitoring occasions for PDCCH transmission including both normal PDCCH transmission (i.e. PDCCH transmission in R15/R16) and ePDCCH transmission (i.e. PDCCH transmission in R17) will be discussed.

FIG. 2 is a flow chart illustrating a method for enhanced PDCCH monitoring on overlapping PDCCH monitoring occasions according to some embodiments of the present application. The method in FIG. 2 may be performed between a BS (such as, the BS 101 in FIG. 1) and the UE (such as, the UE 105 in FIG. 1) in the wireless communication system 100 in FIG. 1. It should be understood that the following description of FIG. 2 is a general description of enhanced PDCCH monitoring on overlapping PDCCH monitoring occasions for both normal PDCCH transmission (i.e. PDCCH transmission in R15/R16) and ePDCCH transmission.

As shown in FIG. 2, in operation 201, a BS may transmit configuration information for monitoring a plurality of PDCCH transmissions to a UE, and the configuration information includes a plurality of search space sets.

For the BS, in operation 202, the BS may select at least one search space set with different QCL-Type D information from each other to be monitored by the UE from the plurality of search space sets based on a rule. And then, in operation 204, the BS may transmit at least one PDCCH transmission corresponding to at least one search space set including the selected at least one search space set. Furthermore, if search space set(s) with the same QCL-Type D information as the selected at least one search space set exist, the BS may further transmit PDCCH transmission(s) corresponding to the search space set(s) with the same QCL-Type D information as the selected at least one search space set. That is, the PDCCH transmission(s) transmitted by the BS correspond to the search space sets including the selected at least one search space set and the search space set(s) with the same QCL-Type D information as the selected at least one search space set.

For the UE, after receiving the configuration information for monitoring a plurality of PDCCH transmissions from the BS, in operation 203, the UE selects at least one search space set with different QCL-Type D information from each other for monitoring from the plurality of search space sets based on the rule. The rule may be preconfigured, predetermined, or configured by a base station (BS). And in operation 205, the UE monitors at least one search space set including the selected at least one search space set on PDCCH monitoring occasions and receives the corresponding PDCCH transmission(s). Furthermore, if search space set(s) with the same QCL-Type D information as the selected at least one search space set exist, the UE may further monitor the search space set(s) with the same QCL-Type D information as the selected at least one search space set on the PDCCH monitoring occasions. That is, the search space sets monitored by the UE include the selected at least one search space set and the search space set(s) with the same QCL-Type D information as the selected at least one search space set.

In the following, the operation of selecting the search space set(s) with different QCL-Type D information from each other for monitoring based on the rule in operation 202 or operation 203 will be described in detail with respect to normal PDCCH transmissions by referring to an exemplary scenario as shown in FIG. 3 and with respect to one full PDCCH transmission (which relates to ePDCCH transmission and the normal PDCCH transmission) by referring to some exemplary scenarios as shown in FIGS. 4-6.

For normal PDCCH transmissions, the BS or the UE may select a search space set with the highest priority from each search space superset, where one search space superset may include one or more search space sets.

In an embodiment of the present application, the search space superset may be associated with the same UE panel or the same TCI information associated with a UE panel implicitly. Accordingly, the number of the search space supersets may be equal to the number of the UE panels or the number of the TCI information associated with UE panels implicitly. In other words, the UE panel information or the TCI information associated with UE panels can be used for determining a search space superset.

In particular, for each search space set, it can be associated with one CORESET with one TCI state. In an example, TCI information associated with a UE panel may be the receiving beam refinement CSI-RS resource set information for each panel. For a UE with multiple panels, there will be multiple TCI states with different QCL-type D, and each TCI state with QCL-type D is associated with one UE panel. One search space superset may include multiple search space sets, whose corresponding TCI states are associated with the same UE panel. Thus, the number of search space supersets is equal to the number of UE panels, and search space sets from different supersets may be monitored simultaneously. For overlapping PDCCH monitoring occasions, each associated search space set will fall into one corresponding superset according to its associated UE panel.

In another embodiment of the present application, the search space superset may be associated with the same TRP or the same CORESET pool index implicitly. Accordingly, the number of the search space supersets may be equal to the number of the TRPs or the number of the CORESET pool indexes implicitly. That is, one search space superset can be implicitly associated with one TRP. Here one panel is assumed to receive data/control information from one TRP. CORESETPoolIndex in the CORESET configuration can be used for determining a search space superset.

In this embodiment, the BS or the UE may select a search space set with the highest monitoring priority from each search space superset. For example, the priority rule may be associated with the type of search space (USS set or CSS set), the index of search space, or the index of cell.

In an example, for each superset, the priority rule defined in R15 may be used to find the search space set with the highest monitoring priority. Thus, the UE only monitors the search space set with different QCL-Type D with the highest monitoring priority from each superset. The details of the rule in the embodiments of the present application may be that the highest priority QCL-Type D in each superset is associated with CSS set with the lowest index in the cell with the lowest index containing CSS; if there is no CSS, the highest priority QCL-Type D in each superset is associated USS set with lowest index in the cell with the lowest index.

FIG. 3 is an exemplary scenario for enhanced PDCCH monitoring on overlapping PDCCH monitoring occasions with respect to normal PDCCH transmissions according to an embodiment of the present application. That is, normal PDCCH transmissions are assumed to be monitored on overlapping PDCCH monitoring occasions in FIG. 3.

As shown in FIG. 3, there are 3 normal PDCCH transmissions with 3 search space sets in one overlapping PDCCH monitoring occasion. From the configuration information, the normal PDCCH transmission 301 is associated with USS 1 in CORESET 1 and associated with TCI state 1 with QCL-type D1, the normal PDCCH transmission 302 is associated with USS 2 in CORESET 2 and associated with TCI state 2 with QCL-type D2, and the normal PDCCH transmission 303 is associated with USS 3 in CORESET 3 and associated with TCI state 3 with QCL-type D3.

In an embodiment, from the configuration information, USS 1 and USS 3 will be received by panel 1 and USS 2 will be received by panel 2. Thus, based on the presumption that a search space superset being associated with the same UE panel, a first search space superset may include USS 1 and USS 3, and a second search space superset may include USS 2. According to the above priority rule, the UE may select USS 1 (the USS set with the lowest index in the first search space superset) and USS 2 (the USS set with the lowest index in the second search space superset) to monitor on the overlapping PDCCH monitoring occasion since they have the lowest search index in their superset.

In another embodiment, from the configuration information, the normal PDCCH transmission 301 is from TRP 1, the normal PDCCH transmission 302 is from TRP 1, and the normal PDCCH transmission 303 is from TRP 2. Thus, based on the presumption that a search space superset being associated with the same TRP, a first search space superset may include USS 1 and USS 2, and a second search space superset may include USS 3. According to the above priority rule, the UE may select USS 1 (the USS set with the lowest index in the first search space superset) and USS 3 (the USS set with the lowest index in the second search space superset) to monitor on the overlapping PDCCH monitoring occasion since they have the lowest search index in its superset.

In yet another embodiment, the case of PDCCH overbooking is considered. In particular, in R16, PDCCH overbooking is only applicable to USS sets associated with the CORESET(s) that are configured with CORESETPoolIndex=0 if CORESETPoolIndex is configured.

In the embodiment of the present application, in the case that there is no allocated PDCCH candidate in the search space set with the highest priority, a USS set with a next highest priority is selected from the search space superset. For example, when there are no allocated PDCCH candidates for USS sets (e.g. from CORESETPoolIndex=0), the next high priority USS in the same superset can be substituted for monitoring. Taking FIG. 3 as an example, when the normal PDCCH transmission 301 and 302 associated with USS 1 and USS 2 respectively are transmitted from TRP 1 (associated with CORESETPoolIndex=0); the normal PDCCH transmission 303 associated with USS 3 is transmitted from TRP2. Based on a search space superset being associated with the same TRP, a first search space superset may include USS 1 and USS 2, and a second search space superset may include USS 3. When there is no PDCCH candidate for USS 1 because of PDCCH overbooking, the second priority USS 2 from TRP1 (associated with CORE-SETPoolIndex=0) is selected. Thus, the UE will monitor USS 2 and USS 3 on the overlapping PDCCH monitoring occasion.

In the following, the operation of selecting the search space set(s) with different QCL-Type D information from each other for monitoring based on the rule in operation 202 or operation 203 will be described in detail with respect to one full PDCCH transmission by referring to the exemplary scenarios as shown in FIGS. 4-6. The search space set(s) associated with one full PDCCH transmission is selected for monitoring on the monitoring occasions. The full PDCCH transmission may indicate a normal PDCCH transmission with one transmission of a DCI or multiple transmissions of an ePDCCH transmission with multiple transmissions of a DCI.

In R17, PDCCH is enhanced with higher reliability, where resources from multiple TRPs can be used for a DCI transmission. It is possible that one PDCCH transmission can be transmitted with multiple TCIs. For FDM-based scheme, multiple TCI states are required to be monitored in one occasion. For TDM-based scheme, multiple TCI states can be used for multiple repetition transmission, which is an example of ePDCCH transmission. Performance for ePDCCH transmission can be guaranteed only when multiple TCI states can be monitored. Thus, PDCCH monitoring behavior also needs to consider the case for ePDCCH transmission.

In some embodiments of the present application, based on a rule, the full PDCCH transmission (that is, one normal PDCCH transmission or multiple transmissions of an ePDCCH transmission) is given a higher priority, which will be described in detail in connection with the following specific embodiments of the present application.

In an embodiment, when FDM-based ePDCCH transmission scheme is used, a higher priority is given to search space sets for the multiple transmissions of an ePDCCH transmission relative to normal PDCCH transmission. Thus, the BS or the UE will select the search space sets for the multiple transmissions of the ePDCCH transmission rather than a normal PDCCH transmission when a FDM based ePDCCH transmission scheme is used.

In another embodiment, when FDM-based ePDCCH transmission scheme is used, the priority can be determined based on USS index of search space sets for the normal PDCCH transmission and ePDCCH transmission, if there is no CSS index configured. That is, when multiple search space sets are configured for the normal PDCCH transmission and the ePDCCH transmission, the lowest (or smallest) search space set index or newly configured joint search space set index can be used to determine monitoring priority.

In an example, when FDM-based ePDCCH transmission scheme is used, in the case that the normal PDCCH transmission has a lowest search space set index among search space sets for the multiple transmissions of the ePDCCH transmission and the normal PDCCH transmission, a search space set for the normal PDCCH transmission may be selected on the overlapping PDCCH monitoring occasion. In another example, when FDM-based ePDCCH transmission scheme is used, in the case that one of the plurality of search space sets for the multiple transmissions of the ePDCCH transmission has a lowest search space set index among search space sets for the multiple transmissions of the ePDCCH transmission and the normal PDCCH transmission, a plurality of search space sets for the multiple transmissions of the ePDCCH transmission may be selected on the overlapping PDCCH monitoring occasion.

FIG. 4 is an exemplary scenario for enhanced PDCCH monitoring on overlapping PDCCH monitoring occasions when a FDM-based ePDCCH transmission scheme is used according to another embodiment of the present application.

As shown in FIG. 4, there are 3 PDCCH transmissions with 3 search space sets in one overlapping PDCCH monitoring occasion. A normal PDCCH transmission 401 is associated with USS 0 in CORESET 0 and associated with QCL-type DO and will be received by panel 1 with a wide beam. A first transmission 402 of an ePDCCH transmission is associated with USS 1 in CORESET 1 and associated with QCL-type D1 and will be received by panel 1 with refined beam 1. A second transmission 403 of the ePDCCH transmission is associated with USS 2 in CORESET 2 and associated with QCL-type D2 and will be received by panel 2 with refined beam 2.

In this example, since USS 0 for the normal transmission is the lowest search space set index among USS 0 (for the normal transmission), USS 1 and USS 2 (for the ePDCCH transmission), thus USS 0 is selected for monitoring on the overlapping PDCCH monitoring occasion.

When a TDM-based ePDCCH transmission scheme is used, multiple TDM PDCCH monitoring occasions are used for a DCI detection. In an embodiment of the present application, when a TDM-based ePDCCH transmission scheme is used and a first search space set for a first transmission for an ePDCCH transmission is monitored on a previous PDCCH monitoring occasion, a second search space set for a second transmission for the ePDCCH transmission on a current PDCCH monitoring occasion may be selected by giving the second search space set for the second transmission for the ePDCCH transmission a priority higher than that of a search space set for a normal PDCCH transmission.

FIG. 5 is an exemplary scenario for enhanced PDCCH monitoring on overlapping PDCCH monitoring occasions when a TDM-based ePDCCH transmission scheme is used according to an embodiment of the present application. In this exemplary scenario, the TDM-based ePDCCH transmission scheme may be for a UE with a lower capability, e.g. one UE panel.

As shown in FIG. 5, USS for a first transmission 501 for an ePDCCH transmission is monitored on a first PDCCH monitoring occasion, and the USS (USS 1 with QCL-Type D1) for a repeated transmission (that is, a second transmission 503) of the ePDCCH transmission is given a higher monitoring priority relative to other USS for normal transmission (for example, USS 0 with QCL-Type D2 for normal transmission 502) on a second PDCCH monitoring occasion, thus USS 1 for the second transmission 503 for the ePDCCH transmission is selected for monitoring on the second PDCCH monitoring occasion.

In another embodiment of the present application, when a TDM-based ePDCCH transmission scheme is used and a first search space set for a first transmission for an ePDCCH transmission is not monitored on a previous monitoring occasion, a search space set for a normal PDCCH transmission rather than a second search space set for a second transmission for the ePDCCH transmission may be selected on a current monitoring occasion, by giving a search space set for the normal PDCCH transmission a priority higher than that of the second search space set for the second transmission for the ePDCCH transmission.

FIG. 6 is another exemplary scenario for enhanced PDCCH monitoring on overlapping PDCCH monitoring occasions when a TDM-based ePDCCH transmission scheme is used according to another embodiment of the present application. In this exemplary scenario, the TDM-based ePDCCH transmission scheme may be for a UE with a lower capability, e.g. one UE panel.

As shown in FIG. 6, CSS for a normal PDCCH transmission 601 is monitored on a first PDCCH monitoring occasion since CSS has a higher monitoring priority than USS (such as USS 3) for a first transmission 602 for an ePDCCH transmission, that is, the first transmission 602 for the ePDCCH transmission is not monitored on a first PDCCH monitoring occasion. According the rule (that is, a higher priority is given to the full PDCCH transmission), USS 1 for a second transmission 603 for the ePDCCH transmission will have lower priority than USS 2 for another normal PDCCH transmission 604 since the first transmission 602 for the ePDCCH transmission is not monitored on the first PDCCH monitoring occasion but USS 2 can be used for monitoring normal PDCCH transmission 604 fully, thus USS 2 for normal PDCCH transmission 604 is selected for monitoring on the second PDCCH monitoring occasion.

In some other embodiments, the rule (that is, higher priority is given to the full PDCCH transmission) may not be followed but the rule of independently selecting the lowest search space set from each search space superset may be followed.

For example, with respect to the exemplary scenario as shown in FIG. 4, the search space set(s) with different QCL-Type D information from each other for monitoring may be selected based on the monitoring priority from each search space superset. That is, the search space set with the highest priority is selected independently in the search space superset. In the case that the search space superset is associated with the same UE panel, as shown in FIG. 4, since the normal PDCCH transmission 401 associated with USS 0 will be received by panel 1, the first transmission 402 of an ePDCCH transmission associated with USS 1 will be received by panel 1, and the second transmission 403 of the ePDCCH transmission associated with USS 2 will be received by panel 2, the first search space superset includes USS 0 and USS 1, the second search space superset includes USS 2, thus USS 0 can be selected for monitoring by UE panel 1 and USS 2 can be selected for monitoring by UE panel 2 on the overlapping PDCCH monitoring occasion.

With respect to the exemplary scenario as shown in FIG. 5, the search space set(s) with different QCL-Type D information from each other for monitoring may be selected according to the priority rule in R15. That is, the highest priority for monitoring is given to the smallest USS index if CSS is not configured. Since USS 0 is the lowest (lower) search space set on the second PDCCH monitoring occasion, thus USS 0 for the normal PDCCH transmission 502 is selected for monitoring on the second PDCCH monitoring occasion.

Therefore, through the above described embodiments of the present application, a priority rule is specified and used to select search space sets with multiple QCL-Type D for monitoring on PDCCH monitoring occasions with respect to a normal PDCCH transmission and ePDCCH transmission on account of enhanced UE capability (for example, having multiple panels) and ePDCCH transmission with multiple TCI states, thus enhanced PDCCH monitoring for multiple PDCCH with different QCL-Type D on overlapped monitoring occasions can be realized.

FIG. 7 illustrates an apparatus according to some embodiments of the present application. In some embodiments of the present application, the apparatus 700 may be UE 105 illustrated in FIG. 1 or the UE in other embodiments of the present application.

As shown in FIG. 7, the apparatus 700 may include a receiver 701, a transmitter 703, a processer 705, and a non-transitory computer-readable medium 707. The non-transitory computer-readable medium 707 has computer executable instructions stored therein. The processer 705 is configured to be coupled to the non-transitory computer readable medium 707, the receiver 701, and the transmitter 703. It can be contemplated that the apparatus 700 may include more computer-readable mediums, receivers, transmitters and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause the apparatus 700 to implement the above methods according to embodiments of the present application.

FIG. 8 illustrates an apparatus according to some other embodiments of the present application. In some embodiments of the present application, the apparatus 800 may be BS 101, TRP 103*a* or TRP 103*b* illustrated in FIG. 1 or the BS or TRP in other embodiments of the present application.

As shown in FIG. 8, the apparatus 800 may include a receiver 801, a transmitter 803, a processer 805, and a non-transitory computer-readable medium 807. The non-transitory computer-readable medium 807 has computer executable instructions stored therein. The processer 805 is configured to be coupled to the non-transitory computer readable medium 807, the receiver 801, and the transmitter 803. It can be contemplated that the apparatus 800 may include more computer-readable mediums, receivers, transmitters and processors in some other embodiments of the present application according to practical requirements. In some embodiments of the present application, the receiver 801 and the transmitter 803 are integrated into a single device, such as a transceiver. In certain embodiments, the apparatus 800 may further include an input device, a memory, and/or other components.

In some embodiments of the present application, the non-transitory computer-readable medium 807 may have stored thereon computer-executable instructions to cause the apparatus 800 to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving configuration information for monitoring a plurality of physical downlink control channel (PDCCH) transmissions, wherein the configuration information includes a plurality of search space sets;
   selecting at least one search space set: with different quasi co-location (QCL)-Type D information from each other, for monitoring from the plurality of search space sets based on a rule, including selecting a search space set associated with one full PDCCH transmission for monitoring on the monitoring occasions,
   wherein the full PDCCH transmission indicates a normal PDCCH transmission or multiple transmissions of an enhanced PDCCH (ePDCCH) transmission using a frequency division multiplexed scheme, and
   wherein one of the plurality of search space sets for the multiple transmissions of the ePDCCH transmission has a lowest search space set index among search space sets for the multiple transmissions of the ePDCCH transmission and the normal PDCCH transmission; and
   monitoring at least one search space set including the selected at least one search space set on monitoring occasions.

2. The method of claim 1, wherein monitoring the at least one search space set further comprises: further monitoring at least one search space set with a same QCL-Type D information as the selected at least one search space set on the monitoring occasions.

3. The method of claim 1, wherein selecting the at least one search space set for monitoring based on the rule comprises:
   selecting a search space set with a first priority from each search space superset of a plurality of search space supersets,
      wherein the search space superset includes at least one search space set.

4. The method of claim 3, wherein the search space superset is associated with at least one of the following:
   a same UE panel;
   a same transmission configuration indicator (TCI) information associated with a UE panel;
   a same transmit-receive point (TRP); or
   a same control resource set (CORESET) pool index.

5. The method of claim 3, wherein a number of the plurality of search space supersets is equal to at least one of the following:
   a number of UE panels;
   a number of transmission configuration indicator (TCI) information associated with UE panels;
   a number of transmission-receive points (TRPs); or
   a number of control resource set (CORESET) pool indexes.

6. The method of claim 3, wherein selecting the search space set with the first priority from each search space superset comprises: selecting the search space set with the first priority based on at least one of the following:
   a type of search space;
   an index of search space; or
   an index of cell.

7. The method of claim 6, wherein selecting the search space set with the first priority from each search space superset further comprises:

selecting a common search space (CSS) set with a lowest index in a cell with a lowest index containing a CSS set; and selecting a UE specific search space (USS) set with a lowest index in the cell with the lowest index in the case that there is no CSS set in the search space superset.

8. The method of claim 7, wherein selecting the search space set with the first priority from each search space superset further comprises:

when there is no allocated PDCCH candidates in the search space set with the first priority, selecting a USS set with a second priority from the search space superset.

9. The method of claim 1, wherein the full PDCCH transmission indicates the normal PDCCH transmission with one transmission of a downlink control information (DCI) or multiple transmissions of the ePDCCH transmission with multiple transmissions of the DCI.

10. The method of claim 1, wherein selecting the at least one search space set associated with one full PDCCH transmission for monitoring on the monitoring occasions comprises:

when a time-division multiplexed based ePDCCH transmission scheme is used and a first search space set for a first transmission for the ePDCCH transmission is monitored on a previous monitoring occasion, selecting a second search space set for a second transmission for the ePDCCH transmission on a current monitoring occasion by giving the second search space set for the second transmission for the ePDCCH transmission a priority higher than that of a search space set for the normal PDCCH transmission.

11. The method of claim 1, wherein selecting the at least one search space set associated with one full PDCCH transmission for monitoring on the monitoring occasions comprises:

when a time-division multiplexed based ePDCCH transmission scheme is used and a first search space set for a first transmission for the ePDCCH transmission is not monitored on a previous monitoring occasion, selecting a search space set for a normal PDCCH transmission rather than a second search space set for a second transmission for the ePDCCH transmission on a current monitoring occasion by giving a search space set for the normal PDCCH transmission a priority higher than that of the second search space set for the second transmission for the ePDCCH transmission.

12. The method of claim 1, wherein a number of the selected at least one search space set depends on a capability of the UE.

13. A user equipment (UE) for wireless communication, comprising:

at least one memory; and at least one processor coupled with the at least one memory and configured to cause the UE to:

receive configuration information for monitoring a plurality of physical downlink control channel (PDCCH) transmissions, wherein the configuration information includes a plurality of search space sets;

select at least one search space set with different quasi co-location (QCL)-Type D information from each other for monitoring from the plurality of search space sets based on a rule, including selecting a search space set associated with one full PDCCH transmission for monitoring on the monitoring occasions, wherein the full PDCCH transmission indicates a normal PDCCH transmission or multiple transmissions of an enhanced PDCCH (ePDCCH) transmission using a frequency division multiplexed scheme, and wherein one of the plurality of search space sets for the multiple transmissions of the ePDCCH transmission has a lowest search space set index among search space sets for the multiple transmissions of the ePDCCH transmission and the normal PDCCH transmission; and monitor at least one search space set including the selected at least one search space set on monitoring occasions.

14. The UE of claim 13, wherein, to monitor the at least one search space set, the at least one processor is configured to cause the UE to: further monitor at least one search space set with a same QCL-Type D information as the selected at least one search space set on the monitoring occasions.

15. The UE of claim 13, wherein the full PDCCH transmission indicates the normal PDCCH transmission with one transmission of a downlink control information (DCI) or multiple transmissions of the ePDCCH transmission with multiple transmissions of the DCI.

16. The UE of claim 13, wherein a number of the selected at least one search space set depends on a capability of the UE.

17. The UE of claim 13, wherein, to select the at least one search space set for monitoring based on the rule, the at least one processor is configured to cause the UE to:

select a search space set with a first priority from each search space superset of a plurality of search space supersets, wherein the search space superset includes at least one search space set.

18. The UE of claim 17, wherein the search space superset is associated with at least one of the following:

a same UE panel;

a same transmission configuration indicator (TCI) information associated with a UE panel;

a same transmit-receive point (TRP); or a same control resource set (CORESET) pool index.

19. The UE of claim 17, wherein a number of the plurality of search space supersets is equal to at least one of the following:

a number of UE panels;

a number of transmission configuration indicator (TCI) information associated with UE panels;

a number of transmission-receive points (TRPs); or a number of control resource set (CORESET) pool indexes.

20. The UE of claim 17, wherein, to select the search space set with the first priority from each search space superset comprises, the at least one processor is configured to cause the UE to select the search space set with the first priority based on at least one of the following:

a type of search space;

an index of search space; or an index of cell.

* * * * *